No. 628,100. Patented July 4, 1899.
L. V. LABELLE.
FERTILIZER DISTRIBUTER.
(Application filed Aug. 30, 1897.)
(No Model.)
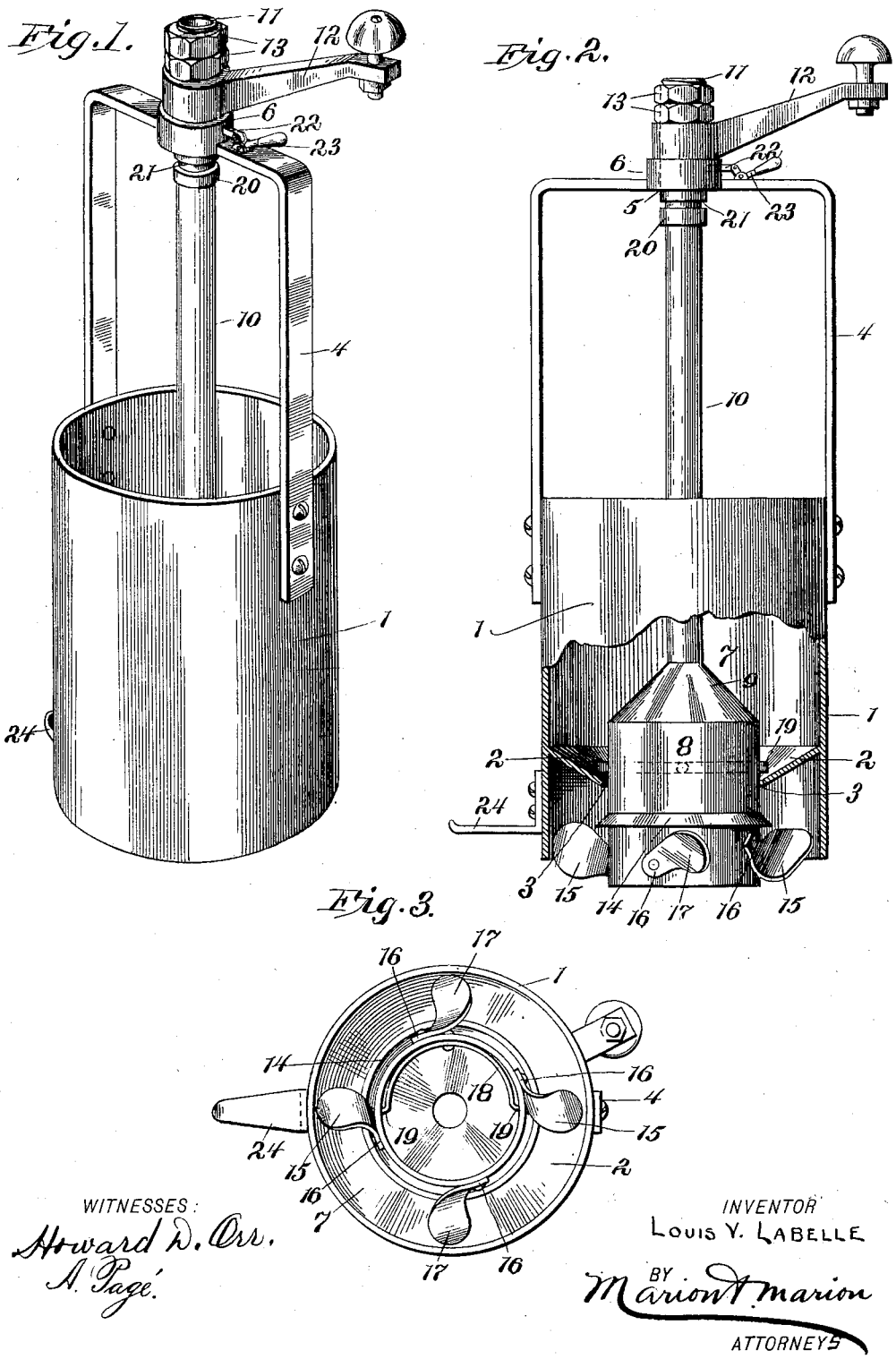
WITNESSES:
Howard D. Orr.
A. Page.
INVENTOR
Louis V. Labelle
BY Marion & Marion
ATTORNEYS

UNITED STATES PATENT OFFICE.

LOUIS VICTOR LABELLE, OF ST. JACQUES L'ACHIGAN, CANADA.

FERTILIZER-DISTRIBUTER.

SPECIFICATION forming part of Letters Patent No. 628,100, dated July 4, 1899.

Application filed August 30, 1897. Serial No. 650,026. (No model.)

*To all whom it may concern:*

Be it known that I, LOUIS VICTOR LABELLE, a citizen of the Dominion of Canada, residing at St. Jacques l'Achigan, county of Montcalm, Province of Quebec, Canada, have invented certain new and useful Improvements in Fertilizer-Distributers, (patented in Canada September 15, 1897, No. 57,410;) and I do declare the following to be a full, clear, and exact description of the invention, such as will enable others skilled in the art to which it appertains to make and use the same.

This invention relates to improvements in fertilizer-distributers, and more particularly relates to distributers of that class which are adapted to be manually transported from plant to plant for supplying the same with the desired fertilizer.

The object of the invention is to provide a fertilizer-distributer of the character mentioned which is simple, light, and compact and one which is so constructed that any desired amount of the fertilizing agent may be quickly and readily applied to the roots of plants without any appreciable fatigue on the part of the operator.

A further object of the invention is to embody in the construction of the distributer efficient means for destroying weeds, seeds, germs, and the like around the growing plants, thereby saving a great amount of work in hoeing, and, furthermore, to so construct the device that the soil may be effectually pulverized, whereby the same is loosened and the pores thereof opened to the action of the air, sun, and rain.

With these and other objects in view, which will appear as the nature of the improvements is better understood, the invention consists, substantially, in the novel construction, combination, and arrangement of parts, as will be hereinafter fully described, illustrated in the accompanying drawings, and pointed out in the appended claims.

In the drawings, Figure 1 is a perspective view of a fertilizer-distributer constructed in accordance with the present invention. Fig. 2 is a side elevation thereof, partly in section, so as to disclose the interior construction. Fig. 3 is a bottom plan view.

Referring to the drawings, the numeral 1 designates a casing or hopper which is preferably circular in cross-section, and said casing is provided at its interior and adjacent to its lower end with a bottom 2, the sides of which are inclined downwardly and converge toward its center, at which point an opening 3 is provided for a purpose which will presently appear. The casing 1 is also provided with an inverted-U-shaped yoke 4, which extends upwardly therefrom, and the sides of said yoke are attached at their lower ends in any suitable manner to the upper end of said casing. The yoke 4 constitutes a handle by which the distributer may be readily carried, and formed in the upper end of said yoke is an opening 5, around which is arranged an upwardly-extending collar 6.

The numeral 7 designates a mixer, which comprises a cylindrical protecting drum or casing 8, open at its lower end and provided with a conical head 9 at its upper end, and connected to and projecting upwardly from said head is a tubular spindle 10. The upper end of said spindle passes through the opening 5 and is arranged to slide therein, and the extremity of said end is provided with a series of screw-threads 11, upon which is mounted a crank 12. By reason of the crank 12 being threaded upon the spindle it will be seen that the position of said crank thereon may be varied, and in order to retain the same in its adjusted position a series of jam-nuts 13 is also mounted upon the threads 11 and adapted to bind against the upper side of the crank 12.

An upwardly-inclined annular cut-off 14 surrounds the protector 8 at a point intermediate its ends, and it will be observed that said protector passes through and works within the opening 3 of the bottom 2, the cut-off being located below the latter. In this position it is evident that as the protector 8 is moved upwardly the cut-off 14 will enter the opening 3 and contact with the contiguous edges of the bottom 2, thereby stopping the flow of the fertilizer, which is confined within the space above said bottom. A series of diametrically opposite curved pulverizing-blades 15 is carried by the protector 8 at its lower end, and each of said blades is provided with a shank 16, by which the same is attached to the protector. A series of similarly-shaped mixing-blades 17 is also carried by the protector 8 and arranged diametrically opposite; but said mixing-blades alternate with the pulverizing-blades, as clearly shown, and are also reversely inclined thereto. By this construction it is apparent that as the protecting drum or casing is rotated the blades 15 operate upon the ground so as to open and pulverize the same, while the blades 17 by reason of being reversely inclined thoroughly mix the fertilizer with the soil.

Arranged within the drum 8 is a substantially U-shaped spring 18, the ends of which are provided with outwardly-projecting scraping-spurs 19, which pass through the sides of said drum and extend beyond the same, and said spurs are designed to force the fertilizer through the opening 3 as the drum is rotated.

A collar 20 is fixed to the upper end of the spindle 10 and adapted to readily slide through the opening 5, and said collar is provided with a peripheral groove 21, which receives the inner end of a horizontally-disposed locking-pin 22. The latter passes through the collar 6 and has its outer end pivotally connected to a bell-crank lever 23, which in turn is pivoted to the yoke 4, and it will thus be seen that when the collar 20 is moved upwardly, so that the groove 21 lies opposite to the pin 22, the latter may be forced into said groove, thereby preventing descent of the mixer and also retaining the cut-off 14 in the opening 3.

A foot-rest 24 is attached to the exterior of the casing 1 for holding the distributer in proper position when operating upon a plant.

In practice the fertilizing agent is placed in the casing or hopper 1, the opening 3 being of course closed by the cut-off 14, and when it is desired to supply a plant or a series thereof with the fertilizer the distributer is conveyed thereto. The drum or casing 8 is then placed over the plant to be operated upon, thus entirely covering and protecting the same, and by means of the tubular spindle 10 this positioning of the distributer is positively insured, since said spindle is of sufficient diameter to permit the plant being seen therethrough. The lever 23 is now manipulated in order to withdraw the locking-pin 22 from the groove 21 and pressure applied to the crank 12, which pressure forces the casing 8 downwardly to the position shown in Fig. 2, thereby lowering the cut-off 14 and uncovering the opening 3. By rotating the spindle 10 the spurs 19 will cause the fertilizer to pass through the opening 3, the blades 15 at the same time opening and thoroughly pulverizing the ground around the roots of the plant. Simultaneous with this operation the mixing-blades 17 cause the fertilizer to enter the ground, and after a sufficient quantity of the former has been supplied the cut-off 14 is again moved into the opening 3 in an obvious manner, and hence further flow prevented. If desired, rotation of the mixer may in this position be continued without liability of the opening 3 being uncovered. To regulate the amount of fertilizer which passes through the opening 3, the jam-nuts 13 are adjusted so as to permit change of position of the crank 12, whereby a greater or less length of vertical movement of the spindle 10 may be effected, and thus provide a greater or less space between the bottom 2 and the cut-off 14, through which the fertilizer flows.

From the foregoing description it will be seen that the herein-described improvements provide a fertilizer-distributer which is simple, light, and compact and one which is adapted for use with all kinds of pulverulent fertilizer. Moreover, the device is adapted to distribute the fertilizer in such manner that when the latter is dissolved the same will be properly supplied to the roots, and by means of the blades 15 and 17 weeds, seeds, germs, and the like will be effectually destroyed. The soil is also well pulverized and loosened, thereby opening the pores thereof to the action of the air, sun, and rain.

While the construction herein shown and described is what is believed to be a preferable embodiment of the invention, it is to be understood that I do not limit myself thereto, as various changes in the form, proportion, and minor details of construction may be resorted to, and I therefore reserve the right to modify or vary the invention as falls within the spirit and scope thereof.

Having thus described the invention, what is claimed as new, and desired to be secured by Letters Patent, is—

1. A fertilizer-distributer, comprising a stationary hopper; a revoluble spindle mounted therein; and pulverizing and mixing blades, arranged alternately, mounted on said spindle below said hopper.

2. A fertilizer-distributer, comprising a stationary hopper; a revoluble spindle mounted therein; and pulverizing and mixing blades, arranged alternately, mounted on said spindle below said hopper, said blades having their faces arranged at opposite angles to each other.

3. A fertilizer-distributer, comprising a stationary casing or hopper; a spindle revolubly mounted therein; means connected with said spindle for regulating the passage of the fertilizing agent; and means for mixing the fertilizing agent with the soil.

4. A fertilizer-distributer comprising a stationary hopper; means for regulating the passage of the fertilizing agent from said hopper; and means, located below said hopper, for mixing the fertilizing agent and the soil.

5. A fertilizer-distributer comprising a stationary casing or hopper; a revolubly-mounted protecting-drum located therein; and means connected to said drum for mixing the fertilizing agent with the soil after the same has been passed from the hopper.

6. A fertilizer-distributer comprising a stationary casing or hopper; a revolubly-mounted protecting-drum located therein; means for regulating the passage of the fertilizing agent from the hopper; and means connected to said drum for mixing the fertilizer with the soil.

7. A fertilizer-distributer comprising a stationary casing or hopper; a revolubly-mounted protecting-drum located therein; means for regulating the passage of the fertilizing agent from the hopper; and means connected to said drum for mixing the fertilizer with the soil between said drum and said casing.

8. In a fertilizer-distributer, the combination with a casing or hopper provided with an opening through which the fertilizer is adapted to pass, of a spindle arranged therein, a protecting drum or casing also arranged in said casing and disposed in the opening thereof, said protecting drum or casing being connected to said spindle, means carried by the protecting-drum for pulverizing the soil, means also carried by said protecting-drum for mixing the soil, a cut-off mounted upon the opening of the casing or hopper, and a pin adapted to engage the spindle for locking said cut-off in said opening, substantially as set forth.

9. In a fertilizer-distributer, the combination with a casing or hopper provided with an opening through which the fertilizer is adapted to pass, of a spindle arranged therein, a protecting drum or casing also arranged in said casing and disposed in the opening thereof, said protecting drum or casing being connected to said spindle, a series of blades carried by the protecting-drum for pulverizing the soil, a series of blades also carried by said protecting-drum for mixing the soil, a cut-off mounted upon the protecting-drum and adapted to close the opening of the casing or hopper, and a pin adapted to engage the spindle for locking said cut-off in said opening, substantially as set forth.

10. In a fertilizer-distributer, the combination with a casing or hopper, of a mixer rotatably mounted therein, a crank adjustably mounted on said mixer for operating the same, and means for locking the crank in its adjusted position, substantially as set forth.

11. In a fertilizer-distributer, the combination with a casing or hopper, of a mixer rotatably mounted therein and comprising a protecting drum or casing, a spindle connected thereto, a series of blades for pulverizing the ground, a series of blades for mixing the fertilizer therewith, and a spring disposed in said protecting drum or casing for forcing the fertilizer from the casing or hopper, a crank adjustably mounted on the spindle, and a series of jam-nuts for locking the crank in its adjusted position, substantially as set forth.

12. In a fertilizer-distributer, the combination with a casing or hopper provided with a bottom having its sides inclining downwardly and converging toward the center to form a feed-opening, of a mixer arranged in said casing or hopper and working in said opening, said mixer comprising a protecting drum or casing having its lower end open, a spindle connected to its upper end and projecting upwardly therefrom, said spindle having its upper end screw-threaded, a series of curved pulverizing-blades carried by said protecting-drum and arranged diametrically opposite, a series of curved mixing-blades also carried by said protecting-drum and also arranged diametrically opposite, said mixing-blades alternating with the pulverizing-blades and being reversely inclined thereto, a cut-off mounted upon the protecting-drum and adapted to close the feed-opening of the casing or hopper, and a spring arranged in the protecting-drum and provided at its ends with scraping-spurs, said spurs passing through the sides of said drum and extending into the casing or hopper above the bottom thereof, an upwardly-extending yoke carried by said casing or hopper, the upper end of said spindle passing through said yoke, a crank adjustably mounted on the threaded end of said spindle, a series of jam-nuts also carried by said threaded end for retaining the crank in its adjusted position, a peripherally-grooved collar fixed upon said spindle, and a locking-pin mounted on said yoke and adapted to engage the grooved collar, substantially as and for the purpose set forth.

13. A fertilizer-distributer comprising a hopper for the fertilizing agent; an opening in said hopper; a spindle revolubly mounted in said hopper; means, connected to said spindle closing said opening; and means for locking the closing mechanism in both operative and inoperative positions.

14. A fertilizer-distributer comprising a hopper for the fertilizing agent; an opening in said hopper for the passage of said fertilizing agent; a spindle revolubly mounted in said opening; means for regulating the passage of said fertilizing agent; and means for mixing the agent with the soil after the fertilizing agent has been passed from the hopper.

15. The combination with a fertilizer-distributer, having a protecting-drum located therein; of means connected to said drum for affording a visual access to the interior of said drum, to regulate the placing of the protecting-drum over the plant to be fertilized.

16. The combination with a fertilizer-distributer, having a protecting-drum located therein, said drum having an opening formed at its top; of a tube connected to said drum in said opening, said tube extending upwardly, whereby a visual access will be had to the interior of said drum.

17. A fertilizer-distributer comprising a hopper; an opening formed therein; mechanism for closing said opening; and means for locking the closing mechanism in both operative and inoperative positions, substantially as described.

In witness whereof I have hereunto set my hand in presence of two witnesses.

LOUIS VICTOR LABELLE.

Witnesses:
SERAPHIN MORIN,
JUDE ETHIER.